United States Patent [19]

McLane

[11] Patent Number: 4,878,477
[45] Date of Patent: Nov. 7, 1989

[54] BARBEQUE GRILL WITH FLAMELESS HEATING ELEMENT AND HEAT RESTRICTIVE COOKING SURFACE

[76] Inventor: Jack S. McLane, 3101 Backman Rd., Gaston, S.C. 29503

[21] Appl. No.: 184,689

[22] Filed: Apr. 22, 1988

[51] Int. Cl.$^4$ .......................... A47J 37/00; F24C 3/04
[52] U.S. Cl. ..................................... 126/41 R; 99/444
[58] Field of Search ............ 126/41 R, 25 R; 99/425, 99/444, 445

[56] References Cited

U.S. PATENT DOCUMENTS

| | | | |
|---|---|---|---|
| 3,211,082 | 10/1965 | Sachnoff et al. | 99/444 |
| 3,555,994 | 1/1971 | Nemetz | 99/444 |
| 3,972,346 | 8/1976 | Wormser | 134/504.42 |
| 4,034,662 | 7/1977 | McLane | |
| 4,608,917 | 9/1986 | Faaborg | 99/425 |
| 4,662,349 | 5/1987 | McKenzie et al. | 126/41 R |
| 4,763,639 | 8/1988 | Goldsworthy | 126/25 R |

OTHER PUBLICATIONS

Wingaersheek, Inc., 2 Dearborn Rd., Peabody, Mass., "Spitefire Instruction Manual".

Primary Examiner—Margaret A. Focarino
Assistant Examiner—Denise L. Ferensic
Attorney, Agent, or Firm—Thomas & Kennedy

[57] ABSTRACT

A barbeque grill has an upwardly open housing and a food support grill positioned adjacent the opening. A gas burner includes a tubular heating element positioned within the housing and an external portion positioned on the outside of the housing. The burner external portion is in communication at one end with an end of the heating element and at its other end with a fuel source and the heating element has a number of holes formed along its length within the housing. The fuel is ignited within the external portion of the burner where it burns in torch-like fashion producing heat and pressure that moves into the heating element causing the heating element to become red hot with excess heat escaping through the holes in the heating element into the housing. A disposable cooking pan has a corrugated bottom with a plurality of openings formed therein and is adapted to be supported on the support grill for cooking food. The holes in the pan bottom provide restricted egress of heat from within the housing resulting in a hotter and more evenly heated cooking surface.

14 Claims, 3 Drawing Sheets

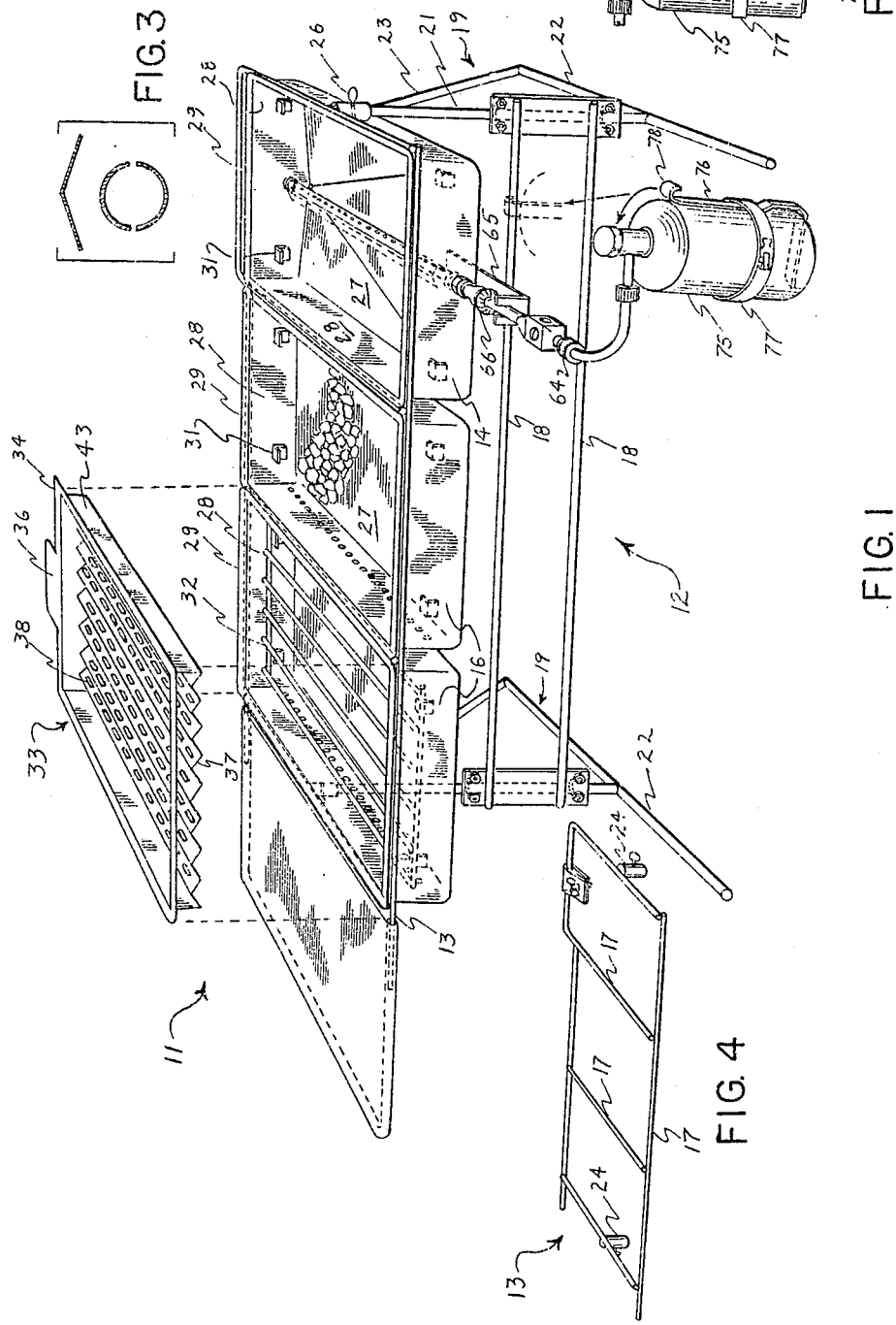

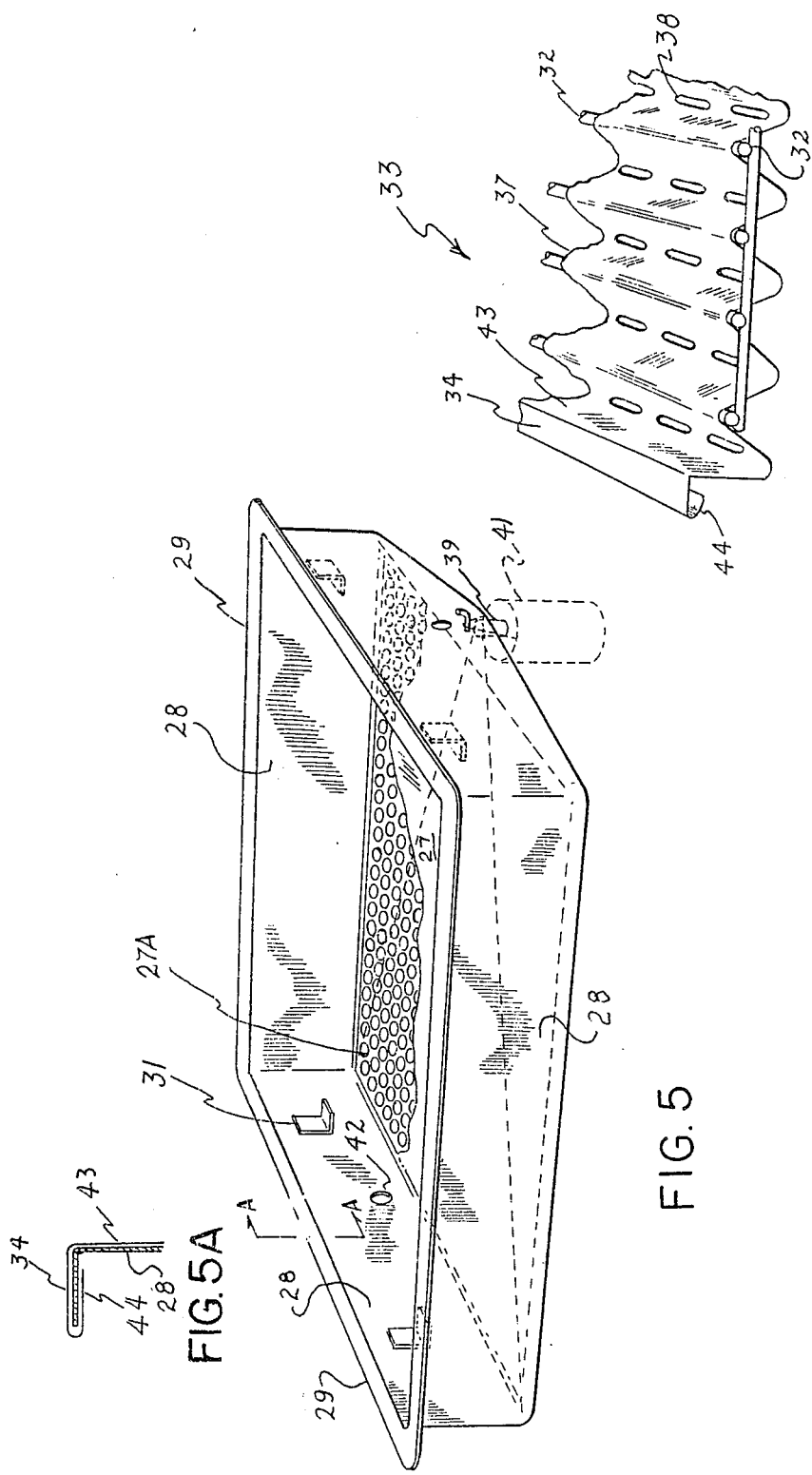

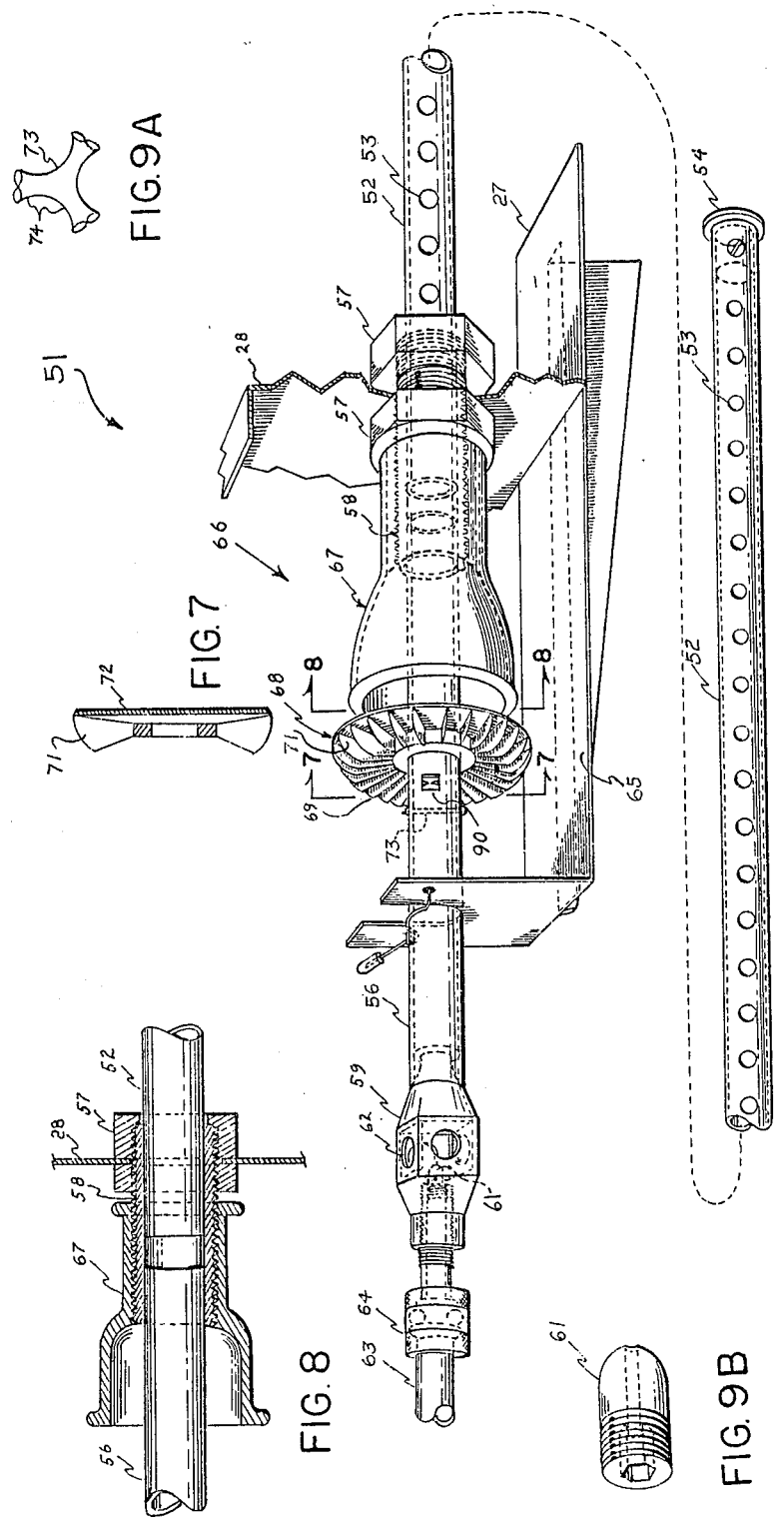

BARBEQUE GRILL WITH FLAMELESS HEATING ELEMENT AND HEAT RESTRICTIVE COOKING SURFACE

FIELD OF THE INVENTION

This invention relates to cooking grills that sometimes are known as barbeque grills and can be used for outdoor cooking, and more particularly to a cooking grill having a flameless heating element and heat restrictive cooking pan.

BACKGROUND OF THE INVENTION

Barbeque grills for cooking meats and other food items are common home appliances. Generally, such grills comprise an upwardly opened housing for containing a source of heat such as charcoal or gas burners, and a parallel bar grill surface for supporting food adjacent the open end of the housing over the heat source. When food is cooked on such grills, it is desirable that grease drippings be allowed to fall onto the heat source and evaporate. The smoke from the evaporated drippings adds a smokey flavor to the food that is enjoyed by many people.

Unfortunately, when grease drippings fall onto charcoal or open flame gas burners, grease fires within the housing of the grills often results which cause food to be burned and to have an undesirable taste. Control of grease fires within the grill housing while simultaneously permitting grease drippings to fall onto a hot surface and evaporate has been a persistent problem in the art.

Attempts to control grease fires within the housing of a grill while permitting drippings to evaporate have been made. Examples include interposing an array of grease catching grates between the heat source and the food, interposing perforated ceramic blocks between the food and the heat source and simply increasing the depth of the grill housing so that the flames emitted from small grease fires are not as likely to contact the food. These methods of controlling grease fires within the grill have not always been satisfactory because the presence of an open flame in the grill housing from the gas burner or from hot charcoal tends to ignite grease that collects on grease collecting grates and ceramic blocks. Increasing the depth of the grill housing is helpful but increases the amount of heat necessary for cooking and results in a large, heavy and difficult to use barbeque qrill.

SUMMARY OF THE INVENTION

The present invention comprises a barbeque grill having a foldable stand that supports a plurality of grill housings. Each housing is of rectangular upwardly open configuration with a conventional parallel bar grill surface mounted adjacent the opening for supporting food. A disposable pan formed from metal foil has a corrugated bottom with openings formed in the valleys thereof. The pan is adapted to be supported on the grill surface with adjacent valleys of the corrugated bottom spanning adjacent rods of the grill surface.

A gas burner includes an elongated metal tubular heating element that extends within at least one of the housings along the length and adjacent the bottom thereof. An external portion of the burner is positioned on the outside of the grill housing and is in communication at one end with an end of the heating element and at its other end with a source of fuel such as, for example, propane gas. The heating element has a plurality of holes formed along its length within the housing.

In use, the fuel is ignited within the external portion of the burner where it burns in torch-like fashion producing heat and pressure that enters the heating element within the housing. The heating element, in turn, becomes red hot within the housing and excess heat and pressure escape through the holes in the heating element. The heating element, therefore, provides heat for cooking food without the presence of an open flame within the housing.

The heat from the heating element rises and impinges upon the bottom of the corrugated pan supported on the grill surface. The openings in the valleys of the pan partially restrict the egress of heat from the housing such that heat tends to build up and spread out across the underside of the pan. The result is a hotter and more evenly heated surface for cooking food.

A heat dissipator is mounted to the external portion of the burner adjacent the grill housing. Heat conducted from the red hot heating element to the external portion of the burner is effectively dissipated to ambiance by the heat dissipator so that exposed portions of the burner remain cool. Further, a grease guard is mounted over the heating element within the housing to prevent grease from dripping directly onto the heating element.

Thus, a barbeque grill that provides heat for cooking food without the presence of an open flame within the grill housing is provided. The absence of an open flame greatly reduces the instance of grease fires within the housing. As a consequence, the housing can be made shallow relative to conventional grills resulting in a more compact and portable grill that requires less fuel to cook food. The openings in the disposable corrugated pan partially restrict egress of heat from the grill housing which results in a hotter and more evenly heated cooking surface. Grease from food cooked on the pan passes down the ridges of the corrugated pan bottom, through the holes therein and onto the hot bottom portion of the grill housing where it evaporates and produces smoke that adds desirable flavor to the food.

BRIEF DESCRIPTION OF THE DRAWINGS

FIG. 1 is an exploded perspective view of the grill showing the primary components thereof.

FIG. 2 is a side elevation of the fuel container showing one method of mounting the fuel container to the support stand.

FIG. 3 is a cross-sectional view of the heating element and the heating element cover.

FIG. 4 is a perspective view of the frame for supporting the individual grill housings upon the stand.

FIG. 5 is a perspective view of an individual grill housing adapted for gas operation.

FIG. 5A is a cross-sectional view of the lip of the grill housing taken along line A—A of FIG. 5.

FIG. 6 is a perspective view of a portion of the pan supported on the support grill showing the openings in the valleys of the pan.

FIG. 7 is a cross sectional view of a portion of the finned heat sink.

FIG. 8 is a cross sectional view showing a portion of the burner and heat dissipator.

FIG. 9 is a perspective view, partially in section of the burner showing the heat dissipator.

FIG. 9A is an elevational view of the swirl actuator.

FIG. 9B is a perspective view of the fuel nozzle.

DETAILED DESCRIPTION

Referring in more detail to the drawings in which like numerals represent like parts throughout the several views, FIG. 1 shows the grill 11 having a stand 12 that supports a grill housing support frame 13. The support frame is formed from metal rods 17 defining openings for accepting a plurality of grill housings. The stand 12 is also formed from metal rods and comprises end portions 19 having vertical stanchions 21 attached at their bottoms to feet members 22 and braced with angular brace members 23. The vertical stanchions are hingedly attached to a pair of parallel horizontal bars 18 at the end portions of the bars such that the end portions 19 of the stand can be folded against the horizontal bars for storage or transport.

The housing support frame 13 is adapted to be releasibly attached at its ends to the tops of the vertical stanchions 21 using attaching means 24 and thumb screws 26 as shown. The housing support frame 13 is sized to receive grill housings 14 and 16 such that they are supported at a convenient cooking height as shown in FIG. 1. Grill housings 16 are adapted to be used with conventional charcoal heat sources while grill housing 14 is adapted to be used with the gas heating element of FIG. 9.

As best seen in FIG. 5, the grill housings are of generally open configuration having a substantially rectangular bottom 27 and four upwardly extending sides 28. Each housing also includes a lip 29 extending around the upper edges of the sides 28 for supporting the housing on the rods of the support frame 13. Brackets 31 are attached to opposing ends of the housings as shown. Grill surface 32 having a plurality of spaced parallel rods for supporting food is adapted to rest on the brackets 31 adjacent the opening of the housing.

FIG. 5 illustrates the grill housing 14 for use with the gas burner. In this embodiment, the bottom 27 is formed to slope downwardly such that grease drippings from food can run downhill and drain through grease drain 39 and into grease collector 41. Opening 42 is formed in one end of the housing to receive the gas burner as described below.

A foraminous sheet 27a is positioned above the bottom 27 and below the position of the heating element 52 (FIG. 9). Sheet 27a becomes hot during cooking such that grease falling on the sheet is evaporated readily producing a desirable smokey flavor in the food. Further, if a grease fire should be started in the bottom 27 of the housing, the foraminous sheet tends to extinguish the flames by limiting the availability of air and thus oxygen to the flame.

In FIG. 6, cooking pan 33 is seen to have a corrugated bottom 37, two upwardly extending sides 43 and a lip 34 attached along opposing legs to the upper edges of the sides 43. Bottom 37 is corrugated to form parallel ridges and valleys as shown with the spacing between adjacent ridges corresponding to the spacing between the bars of the grill surface 32. This allows the pan to rest on the grill surface as shown in FIG. 6 with adjacent valleys spanning the space between adjacent rods of the grill surface.

Openings 38 are formed in the valleys of the pan bottom and are longitudinally offset or staggered relative to openings in adjacent valleys. Grease from food cooked on the pan drains down the walls of the valleys, through the openings 38 and into the grill housing. More importantly, the openings tend to restrict the upward movement of heat from within the housing causing the heat to be partially trapped and to spread out along the underside of the pan 33. This results in a hotter and more evenly heated cooking surface.

While pan 33 can be constructed of various materials, it is preferably formed from a metal foil such as for example, aluminium, so that it can be discarded after use if desired. Further, the lip 44 of the pan 33 can be folded under the lip 29 of the housing if desired (view AA of FIG. 5) to maintain the pan 33 securely in place upon the grill surface 32 and to prevent heat from escaping from the edges of the grill.

As seen in FIG. 9, burner 51 comprises an elongated tubular heating element 52 that extends within the housing adjacent the bottom thereof. Heating element 52 has a plurality of openings 53 formed therealong. The openings 53 formed in the left portion of the heating element in FIG. 9 have a larger diameter than those formed in the right portion to provide a more evenly distributed egress of heat from the openings along the length of the heating element 52. The free end of the heating element within the housing has a cap 54. The other end of the heating element is in communication through opening 42 with the external portion of the burner and particularly with fuel supply pipe 56. In the preferred embodiment, the heating element 52 and fuel supply pipe 56 are mounted in a sleeve 58 with their adjacent ends separated within the sleeve. The sleeve 58 which is threaded around its outer surface, extends through the opening 42 in the housing and is firmly mounted to the housing with opposed locking nuts 57. The distal end of the supply pipe 56 is in communication with a fuel aerator 59 that is in turn in communication with a source of fuel such as, for example, propane gas.

Aerator 59 includes nozzle 61 (FIG. 9B) through which the fuel passes and a plurality of orifices 62 through which air can pass to mix with the fuel. The aerator is connected to the fuel source through a fuel hose 63 that is releasibly attached to the aerator with conventional attaching means 64.

Heat dissipator 66 is mounted to the sleeve 58 and supply pipe 56 adjacent the housing as seen in FIGS. 8 and 9. Heat dissipator 66 dissipates heat to ambience so that excess heat is not conducted from the heating element within the housing to the external portion of the burner. Dissipator 66 comprises flared heat conductor 67 which is threaded onto sleeve 58 as seen in FIG. 8. Mounted to the supply pipe 56 and spaced from the open end of the heat conductor 67 is finned heat sink 68 (FIG. 7). Heat sink 68 comprises grommet 69 with fins 71 extending radially outwardly therefrom. Grommet 69 surrounds and is mounted to supply pipe 56 as shown in FIG. 9. Disk-shaped plate 72 has a central opening and is attached around its periphery to the end portions of the fins 71 as best seen in FIG. 7.

Swirl actuator 73 (FIGS. 9 and 9A) is mounted securely within supply pipe 56 and includes a plurality of actuator blades 74 that are canted relative to the radius of supply pipe 56. Swirl actuator 73 causes the fuel and air mixture to swirl within the supply pipe 56 as it passes the actuator resulting in more efficient burning of the fuel as described below.

In the embodiment of FIG. 1, the fuel is stored in a conventional fuel container 75 that is mounted in an L-shaped bracket 76 using releasible straps 77. The upper portion of the bracket 76 is formed with a hook 78 so that the container can be mounted on the horizontal bars 18 as see in FIG. 2.

OPERATION

The grill of the present invention can be used with conventional charcoal if desired or with the gas burner described above. When used with the gas burner, grill surface 32 is placed on brackets 31 and the corrugated pan 33 is placed on the food support grill. The rim 34 of the pan 33 can be folded under the lip of the grill housing if desired to maintain the pan in place and to prevent excess escape of heat around edges of the pan. Fuel valve 78 is opened allowing fuel to flow through the fuel hose 63, through aerator 59, where the fuel is mixed with ambient air, and into supply pipe 56. As the fuel-/air mixture passes the swirl actuator 73 within the supply pipe, the canted blades of the actuator causes the mixture to swirl within the supply pipe 56.

As the swirling fuel moves past the swirl actuator 73, it is ignited by a conventional igniting means 90 mounted in the sleeve causing the fuel to burn in torchlike fashion within the supply pipe 56. The burning fuel produces heat and pressure that travel into the heating element 52 within the housing. Heating element 52 becomes red hot and excess heat within the element passes through the openings 53 and into the housing. The larger and smaller openings within the tube tend to ensure evenly distributed egress of heat through the openings along the length of the heating element.

The heat radiated from the element and the heat passing through the openings enters the grill housing and rises to come into contact with the corrugated pan 33. The openings in the pan partially restrict egress of heat from the housing so that the heat tends to spread evenly across the bottom of the pan 33 resulting in a hotter and more uniformly heated surface. In addition, grease from the food passes through the openings and onto the bottom of the housing or onto the foraminous sheet 27a where it evaporates and produces smoke that adds flavor to the food. Since there is no open flame within the housing, the grease does not tend to catch fire and burn the food being cooked.

Because of the reduced incidence of grease within the housing the housing can be made shallow relative to prior art grills. Further, the restricted passage of the heat through the cooking surface results in a hotter cooking surface for a given fuel usage and therefore in more efficient operation. The extreme heat of the element within the housing is effectively dissipated by the dissipator means 66 such that external portions of the burner including the supply pipe 56 and the aerator 59 remain cool and do not tend to burn a user. When the food has been cooked, the fuel supply is disconnected and the corrugated pan can be removed and discarded if desired. The discardable pan greatly reduces time and effort required to clean the grill.

The invention has been described in terms of preferred embodiments. It will be obvious to those of skill in the art that many additions, deletions and modifications can be made to the preferred embodiment without departing from the spirit and scope of the invention as set forth in the claims.

What is claimed is:

1. In a barbecue grill of the type having a housing defining an upper opening and a substantially rectangular grill supported a preselected distance below the upper opening with the support grill comprising a plurality of substantially parallel rods, an improvement comprising a substantially rectangular pan adapted to be supported on said support grill, said pan being corrugated to form substantially parallel ridges and valleys with the spacing between adjacent ridges corresponding to the spacing between adjacent rods of the support grill, said valleys having a plurality of openings formed therein with the openings sized to restrict egress of heat from within the housing, and means for producing heat within the housing, said pan further comprising two side members extending upwardly from opposite edges of the pan a distance substantially corresponding to said preselected distance, whereby the pan can be supported upon the food support grill with its side members extending upwardly adjacent the upper opening of the housing.

2. The barbecue grill of claim 1 further including an open substantially rectangular rim having opposing legs with two of said opposing legs mounted to said side members and extending outwardly therefrom.

3. The barbecue grill of claim 2 wherein the housing has a bottom and four upwardly extending sides with the upper edges of the sides including an outwardly extending lip and wherein said rim overlies said lip when said pan is supported on said support grill with said rim being constructed and arranged to be bent around and under said lip to maintain said pan firmly in place on the support grill.

4. A barbecue grill comprising:
a housing defining an upper opening and having a bottom and four upwardly extending sides with the upper edges of said sides having a lip extending outwardly therefrom;
a substantially rectangular food support grill and means for supporting said support grill in a generally horizontal orientation within said housing a preselected distance below the upper opening thereof, said food support grill comprising a plurality of spaced substantially parallel rods;
a substantially rectangular pan having a corrugated bottom and two opposed upwardly extending sides, said pan further including a substantially rectangular open rim mounted to the upper portions of said sides and extending outwardly therefrom;
said bottom of said pan having substantially parallel ridges and valleys with the space between adjacent ridges corresponding to the space between adjacent parallel rods of said support grill so that said pan can be supported upon said support grill with said valleys spanning the spaces between adjacent parallel rods;
each of said valleys having a plurality of openings formed therein.
said rim being constructed and positioned to overlie said lip when said pan is supported upon said food support grill and to fold around and under said lip to maintain the pan in place on the support grill and prevent escape of excess heat adjacent the upper edges of said sides; and
means for producing heat within said housing.

5. The barbecue grill of claim 4 wherein said openings in said valleys are elongated and openings in one valley are longitudinally offset from openings in adjacent valleys.

6. The barbecue grill of claim 4 wherein said heat producing means comprises a gas burner having an elongated tubular heating element extending within said housing adjacent the bottom thereof and an external portion having first and second ends and being positioned on the outside of said housing, said heating element having a first end portion within said housing and a second end portion in communication with said first end of said external portion of said burner;

said heating element having a plurality of holes formed along the length thereof within said housing;

said second end of said external portion being in fluid communication with a source of fuel and including means for igniting said fuel as the fuel moves through said external portion;

whereby heat from said burning fuel within said external portion passes through said heating element within said housing causing said element to become heated with excess heat from the burning fuel passing through said plurality of holes and into said housing.

7. The barbecue grill of claim 6 further including a foraminous sheet positioned adjacent said bottom of said housing below said heating element.

8. The barbecue grill of claim 6 wherein said first end portion of said heating element is closed.

9. The barbecue grill of claim 6 further comprising heat dissipating means mounted to said external portion of said burner for dissipating heat from said external portion to ambience.

10. The barbecue grill of claim 9 wherein said dissipating means comprises a heat sink having an annular grommet surrounding and mounted to said external portion of said burner spaced from said housing, and a disk shaped washer having a central opening surrounding said external portion adjacent said grommet, said grommet having a plurality of fins extending radially outwardly therefrom with the distal ends of the fins being attached to said washer adjacent its outer circumference, and means mounted to said external portion of said burner between said heat sink and said housing for directing heat from said heating element toward said heat sink.

11. The barbecue grill of claim 10 wherein said heat directing means comprises a generally tubular tapered heat conducting member having a smaller end portion and a larger end portion, said smaller end portion surrounding and mounted to said burner external portion of said burner adjacent said housing with said larger end portion being positioned adjacent said heat sink.

12. The barbecue grill of claim 6 further comprising fuel swirling means mounted within said external portion of said burner for causing fuel to swirl within said external portion prior to being ignited so that the burning efficiency of the fuel is increased, said fuel swirling means comprising a swirl actuator having a hub and a plurality of outwardly extending actuator blades with the blades having a predetermined pitch relative to the direction of movement of the fuel within the external portion.

13. The barbecue grill of claim 6 wherein a portion of said plurality of holes adjacent said first end portion of said heating element have a first diameter and a portion of said plurality of holes adjacent said second end portion of said heating element have a second diameter, said second diameter being larger than said first diameter.

14. The barbecue grill of claim 6 further comprising means mounted between said heating element and said support grill for preventing grease drippings from food cooked on said support grill from falling onto said heating element.

* * * * *